(12) United States Patent
Sazawa et al.

(10) Patent No.: US 8,504,899 B2
(45) Date of Patent: Aug. 6, 2013

(54) DATA TRANSFER METHOD AND INFORMATION PROCESSING APPARATUS

(75) Inventors: Shinichi Sazawa, Kawasaki (JP); Yuichi Sato, Kawasaki (JP); Hiroaki Kameyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 251 days.

(21) Appl. No.: 13/067,301

(22) Filed: May 23, 2011

(65) Prior Publication Data
US 2012/0054574 A1    Mar. 1, 2012

(30) Foreign Application Priority Data
Aug. 26, 2010 (JP) .................................. 2010-189063

(51) Int. Cl.
  *G11C 29/00* (2006.01)
  *G01R 31/28* (2006.01)
(52) U.S. Cl.
  USPC ........................................ 714/774; 714/712
(58) Field of Classification Search
  USPC .................. 714/774, 712, 741, 745, 746, 752, 714/799; 370/379.1, 395.4, 395.5, 395.51, 370/395.52, 241, 241.1, 242; 703/13, 21, 703/23
  See application file for complete search history.

(56) References Cited

U.S. PATENT DOCUMENTS

| | | | |
|---|---|---|---|
| 5,740,465 A * | 4/1998 | Matsunami et al. | 710/5 |
| 7,813,317 B2 * | 10/2010 | Nagata et al. | 370/329 |
| 2011/0252293 A1 * | 10/2011 | Varadarajan et al. | 714/784 |

FOREIGN PATENT DOCUMENTS
JP  2006-287598  10/2006

* cited by examiner

*Primary Examiner* — Christine Tu
(74) *Attorney, Agent, or Firm* — Staas & Halsey LLP (57) ABSTRACT

A data transfer method transfers data encoded with a loss correction code by using a protocol having no error correction function. The method includes acquiring a data size of transfer target data; acquiring a relationship between a code length of the loss correction code and a transfer time for the acquired data size of the transfer target data; determining an optimum code length of the loss correction code for encoding the transfer target data based on the acquired relationship between the code length and the transfer time for the acquired data size; and encoding the target data with the loss correction code having the optimum code length.

7 Claims, 10 Drawing Sheets

| CODE LENGTH | F (ms) ENCODING/DECODING TIME (10MB) | G1 (ms) TX TIME (1KB) | G2 (ms) TX TIME (1MB) | G3 (ms) TX TIME (100MB) |
|---|---|---|---|---|
| 100 | 10 | 120 | 310 | 811 |
| 200 | 13 | 80 | 230 | 710 |
| 300 | 16 | 65 | 180 | 600 |
| 400 | 18 | 60 | 120 | 510 |
| 500 | 21 | 62 | 80 | 413 |
| 600 | 25 | 63 | 65 | 310 |
| 700 | 27.5 | 66 | 60 | 230 |
| 800 | 30 | 75 | 62 | 180 |
| 900 | 35 | 83 | 73 | 132 |
| 1000 | 50 | 92 | 88 | 145 |
| 1100 | 100 | 110 | 120 | 183 |

| CODE LENGTH | ENCODING TIME | DECODING TIME | TX TIME | TRANSFER TIME |
|---|---|---|---|---|
| 100 | 25 | 21 | 381 | 427 |
| 200 | 32.5 | 28 | 298 | 358 |
| 300 | 40 | 34 | 239 | 314 |
| 400 | 45 | 39 | 175 | 259 |
| 500 | 52.5 | 45 | 127 | 225 |
| 600 | 62.5 | 54 | 100 | 216 |
| 700 | 68.75 | 59 | 84 | 212 |
| 800 | 75 | 64 | 79 | 218 |
| 900 | 87.5 | 75 | 81 | 244 |
| 1000 | 125 | 107 | 96 | 328 |
| 1100 | 250 | 214 | 129 | 593 |

FIG.9B

DATA TRANSFER METHOD AND INFORMATION PROCESSING APPARATUS

CROSS-REFERENCE TO RELATED APPLICATIONS

This application is based upon and claims the benefit of priority of Japanese Patent Application 2010-189063, filed on Aug. 26, 2010, the entire contents of which are incorporated herein by reference.

FIELD

The disclosures herein relate to a data transfer method, an information processing apparatus, and a computer-readable, non-transitory recording medium storing a data transfer program.

BACKGROUND

Cloud computing is gaining increasing attention as a technology capable of providing various services via networks including the Internet. Because cloud computing may involve frequent data transfers between servers constituting a cloud or between users and the cloud, increasing the data transfer rate of a cloud computing environment is important. The data transfer rate may be increased by hardware or software, as discussed in Japanese Laid-open Patent Publication No. 2006-287598.

In cloud computing, various amounts of data may be transferred between the servers constituting the cloud or between the users and the cloud. In such an environment, the technology discussed in the above related art may not be capable of providing a sufficiently high data transfer rate.

SUMMARY

According to an aspect of the invention, a computer-readable, non-transitory recording medium stores a data transfer program configured to cause a computer to perform a procedure of transferring data encoded with a loss correction code by using a protocol having no error correction function, the procedure including acquiring a data size of transfer target data; acquiring a relationship between a code length of the loss correction code for encoding the transfer target data and a transfer time for the acquired data size of the transfer target data; determining an optimum code length of the loss correction code for encoding the transfer target data based on the acquired relationship between the code length and the transfer time for the acquired data size; and encoding the target data with the loss correction code having the optimum code length.

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENTS

Figure 1:
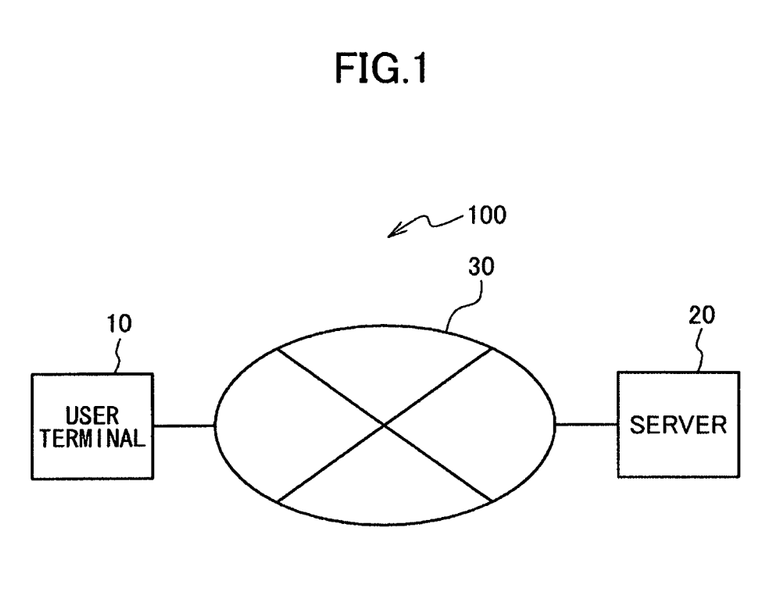
FIG. 1 is a block diagram of an information processing system to which a data transfer method according to an embodiment of the present invention is applied.

Embodiments of the present invention will be described with reference to the accompanying drawings. FIG. 1 is a block diagram of an information processing system 100 in which a data transfer method according to an embodiment of the present invention is applied. The information processing system 100 includes a user terminal (information processing apparatus) 10 and a server 20 connected via a network 30, which may include the Internet, a WAN (Wide Area Network), and the like. The number of the user terminals 10 or the servers 20 connected to the network 30 is not particularly limited. The server 20 may provide various services to the user terminal 10 in the form of software, platforms, hardware, or infrastructures via the network 30. A user may utilize any of the services from the server 20 by using an application installed in the user terminal 10

Figure 2:
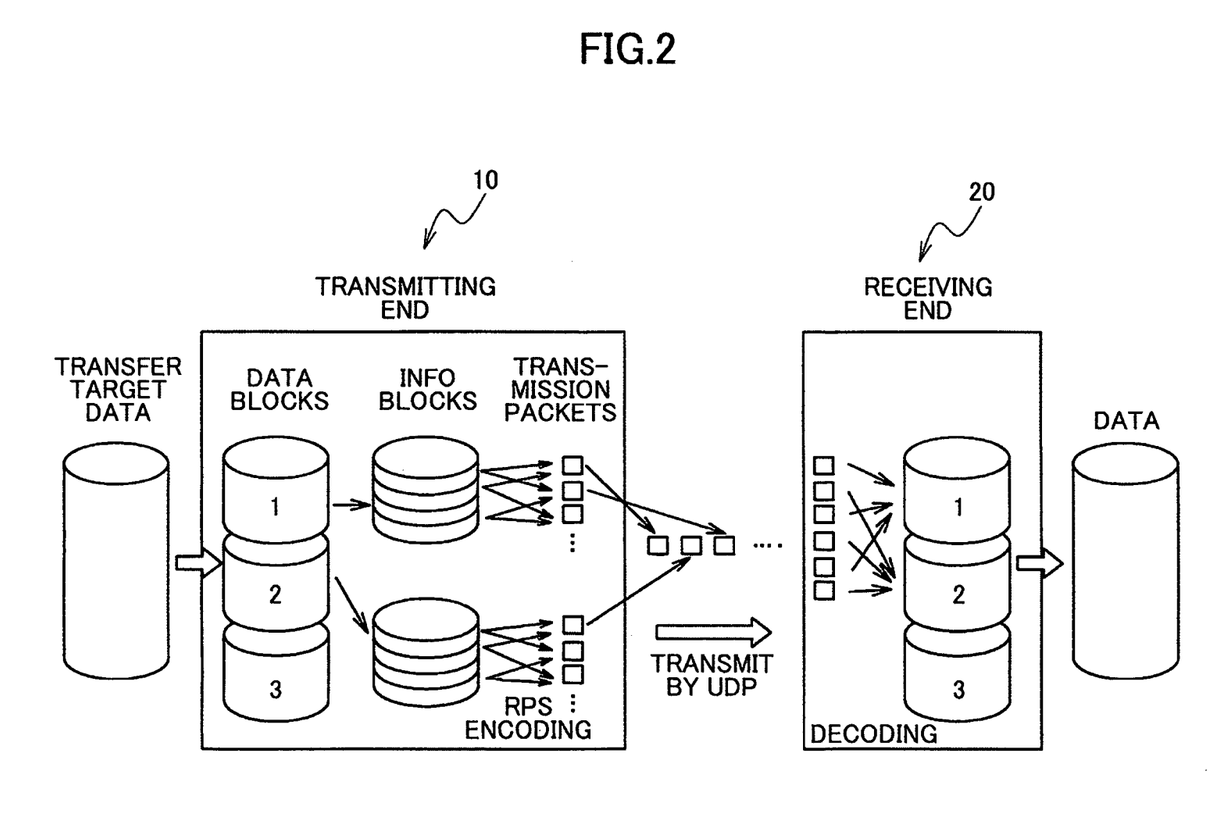
FIG. 2 illustrates a data transfer process according to the present embodiment.

FIG. 2 illustrates a method of transferring data between the user terminal 10 and the server 20 according to the present embodiment. In the illustrated example, the user terminal 10 is on the transmitting end and the server 20 is on the receiving end. In accordance with the present embodiment, the user terminal 10 may transfer data to the server 20 in accordance with the UDP (User Data Protocol). The UDP is a transfer control protocol that does not have an error correction function, in contrast to the TCP (Transmission Control Protocol). While reliability of the UDP may be lower than that of the TCP, the UDP may offer higher data transfer rates than the TCP because of the absence of the error correction function.

In accordance with the present embodiment, in order to compensate for the potential loss of data during transfer by the UDP, the user terminal 10 encodes data using a loss correction code, and transmits encoded packet data to the server 20. The loss correction code is a technology for enabling the recovery of original data in case of loss of some of the data for one reason or another, by adding redundant data to the original data. In accordance with the present embodiment, a RPS (Random Parity Stream) code may be used as the loss correction code. The RPS code is merely an example of the loss correction code; any code capable of restoring lost data may be used.

The user terminal 10 divides data as a transfer target into plural data blocks, and further divides each of the data blocks into information blocks. The information blocks are RPS-encoded to obtain transmission packets that the user terminal 10 transmits to the server 20 by the UDP. The server 20 decodes the received packets and recovers the original data.

Figure 3:
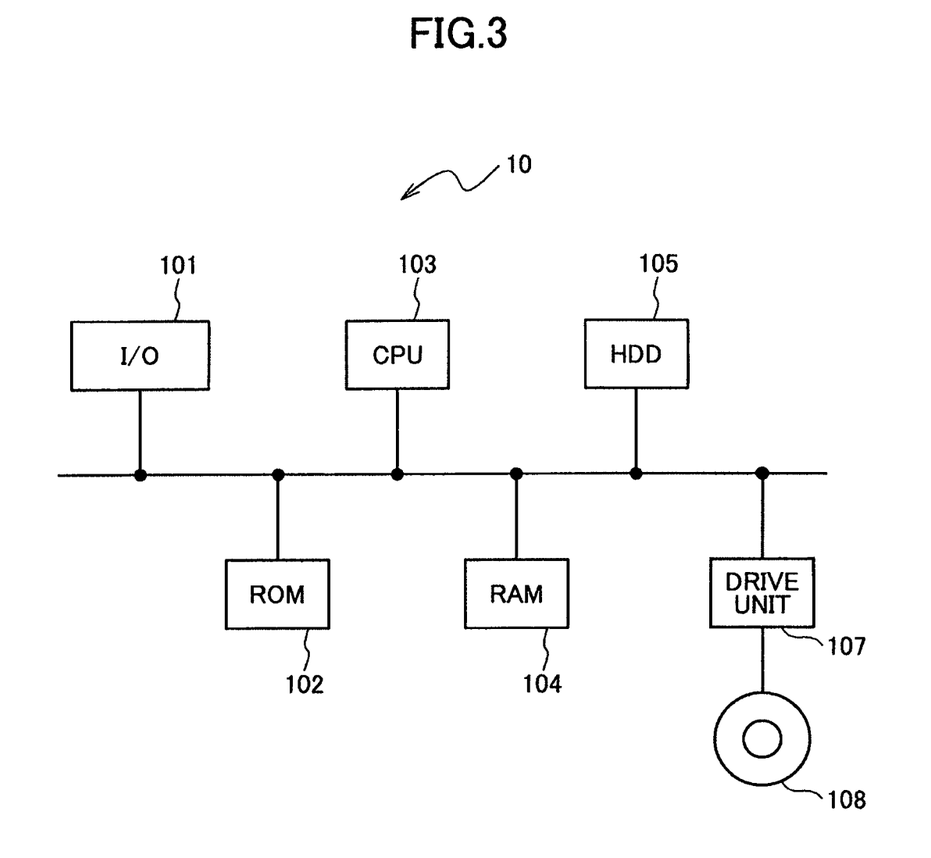
FIG. 3 is a block diagram of a hardware structure of a user terminal in the information processing system according to the present embodiment.

FIG. 3 is a block diagram of a hardware structure of the user terminal 10. The user terminal 10 includes an input/output (I/O) unit 101, a ROM (Read Only Memory) 102, a central processing unit (CPU) 103, a RAM (Random Access Memory) 104, and a HDD (Hard Disk Drive) 105.

The I/O unit 101 enables the delivery of data to or from the server 20. The ROM 102 may store a data transfer program used for transferring data from the user terminal 10 to the server 20, as described later. The data transfer program stored in the ROM 102 may be read and executed by the CPU 103. The ROM 102 may include portable computer-readable recording media such as DVD (digital-versatile disc) and CD-ROM (compact-disc read-only memory). The RAM 104 may store temporary data used when the data transfer program is executed. The HDD 105 may store a table for managing the relationship between code lengths and transfer times for various data sizes, as will be described later. The data transfer program may be stored in a computer-readable recording medium 108, such as a CD-ROM or a DVD, which may be connected to the user terminal 10 via a media drive unit 107.

Figure 4:
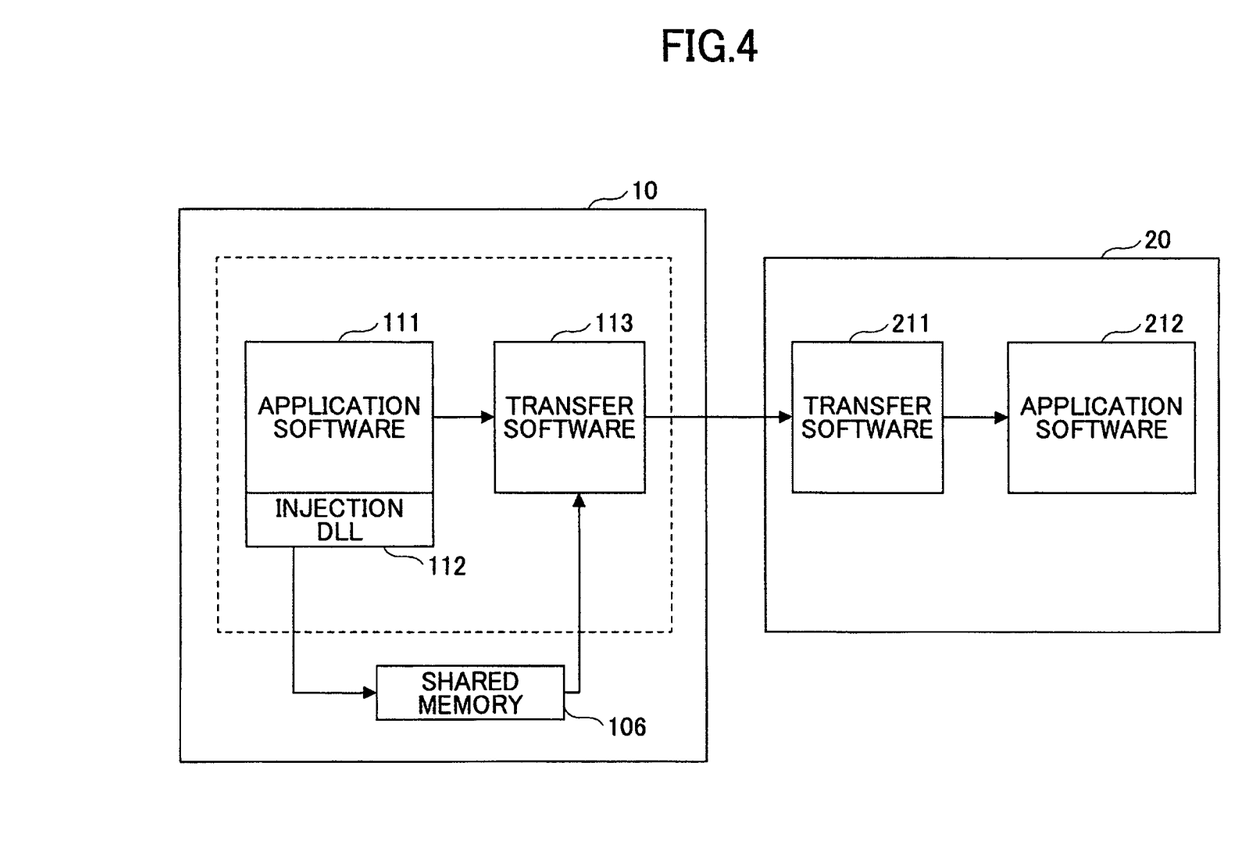
FIG. 4 is a block diagram of a software structure of the user terminal.

FIG. 4 is a block diagram of a software structure of the user terminal 10. The user terminal 10 has installed application software (which may be hereafter referred to as an "application") 111, an injection DLL 112, and transfer software 113. The application 111 may provide a function for enabling the implementation of an operation that a user may wish to execute on the user terminal 10. In the following description, it is assumed that the user of the application 111 transmits transfer target data from the user terminal 10 to an application 212 in the server 20.

The injection DLL 112 is a DLL (Dynamic Link Library) that may be injected into an address space of a process executed by the application 111. The injection DLL 112 may be injected by using an API hooking technique, as described in "Advanced Windows", 5th ed., 2nd. vol., Chapter 22, Jeffrey Richter et al. Upon injection in an address space of a process executed by the application 111, the injection DLL 112 starts up the transfer software 113. The injection DLL 112 may intercept a transmission function that is called when the application 111 transmits data. The injection DLL 112 acquires from the intercepted transmission function a data size of transfer target data that is given to the transmission function as a parameter, and writes the data size into a shared memory 106, which may be provided by the RAM 104.

The transfer software 113 acquires the data size of the transfer target data from the shared memory 106. The transfer software 113 also acquires the data from the application 111 addressed to the application 212 in the server 20. The transfer software 113 determines an optimum code length for transferring the transfer target data in view of its data size. The transfer software 113 transmits the data encoded with the optimum code length to the server 20 by the UDP. The encoded data is received and decoded by transfer software 211 installed in the server 20. The transfer software 211 then transmits the decoded data to the intended destination, i.e., the application 212.

Figure 5:
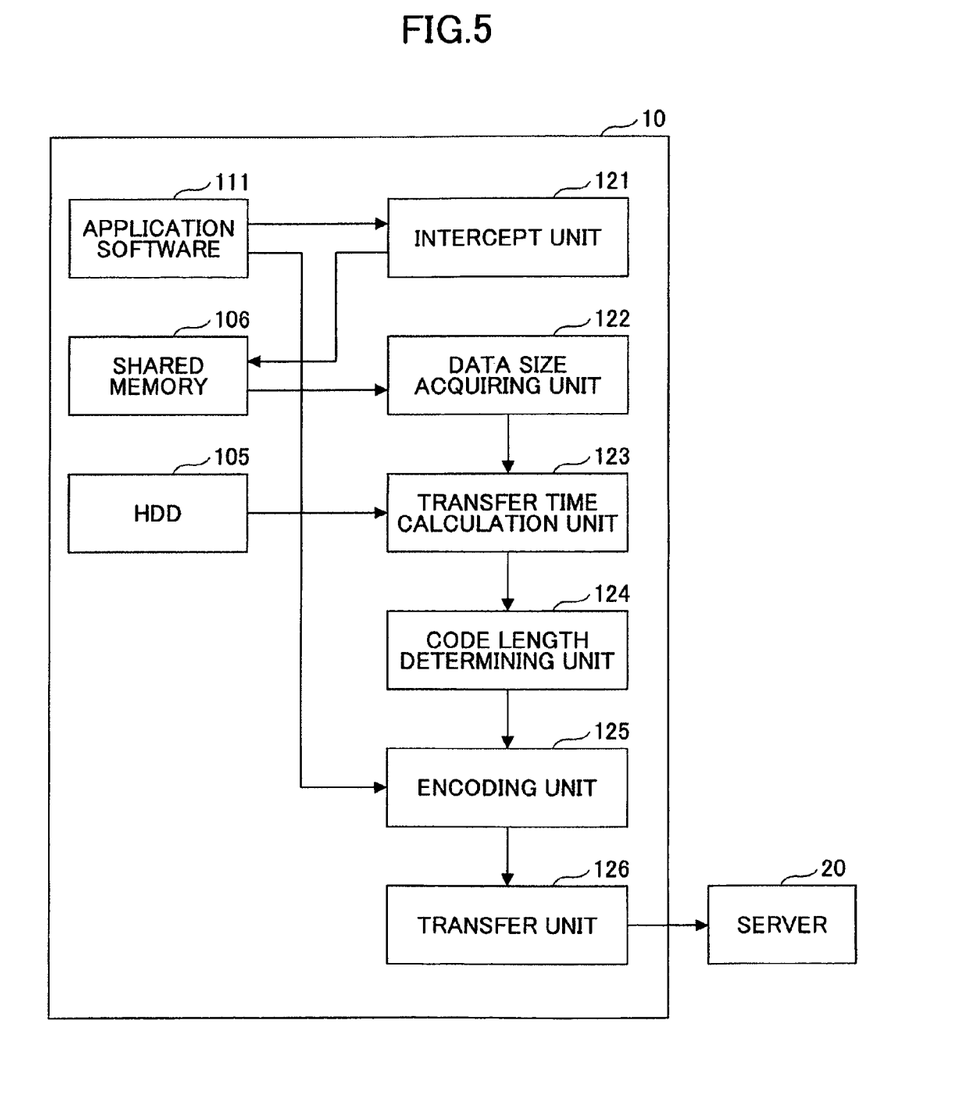
FIG. 5 is a functional block diagram of the user terminal.

FIG. 5 is a functional block diagram of the user terminal 10 which may be realized by the CPU 103 executing the transfer program stored in the ROM 102. The user terminal 10 includes an intercept unit 121, a data size acquiring unit 122, a transfer time calculating unit (relationship acquiring unit) 123, a code length determining unit 124, an encoding unit 125, and a transfer unit 126.

The intercept unit 121 may intercept a transmission function called upon transmission of data from the application 111, and write a data size given to the transmission function as a parameter into the shared memory 106. The intercept unit 121 may be realized upon injection of the injection DLL 112 into an address space of a process executed by the application 111.

The data size acquiring unit 122 acquires the data size of the transfer target data written in the shared memory 106, and outputs the acquired data size to the transfer time calculating unit 123. The transfer time calculating unit 123 receives the data size of the transfer target data from the data size acquiring unit 122. The transfer time calculating unit 123 then calculates a transfer time of the transfer target data for each of plural code lengths, based on transfer time calculation data stored in a memory unit such as the HDD 105, and the data size of the transfer target data.

Figure 6A:
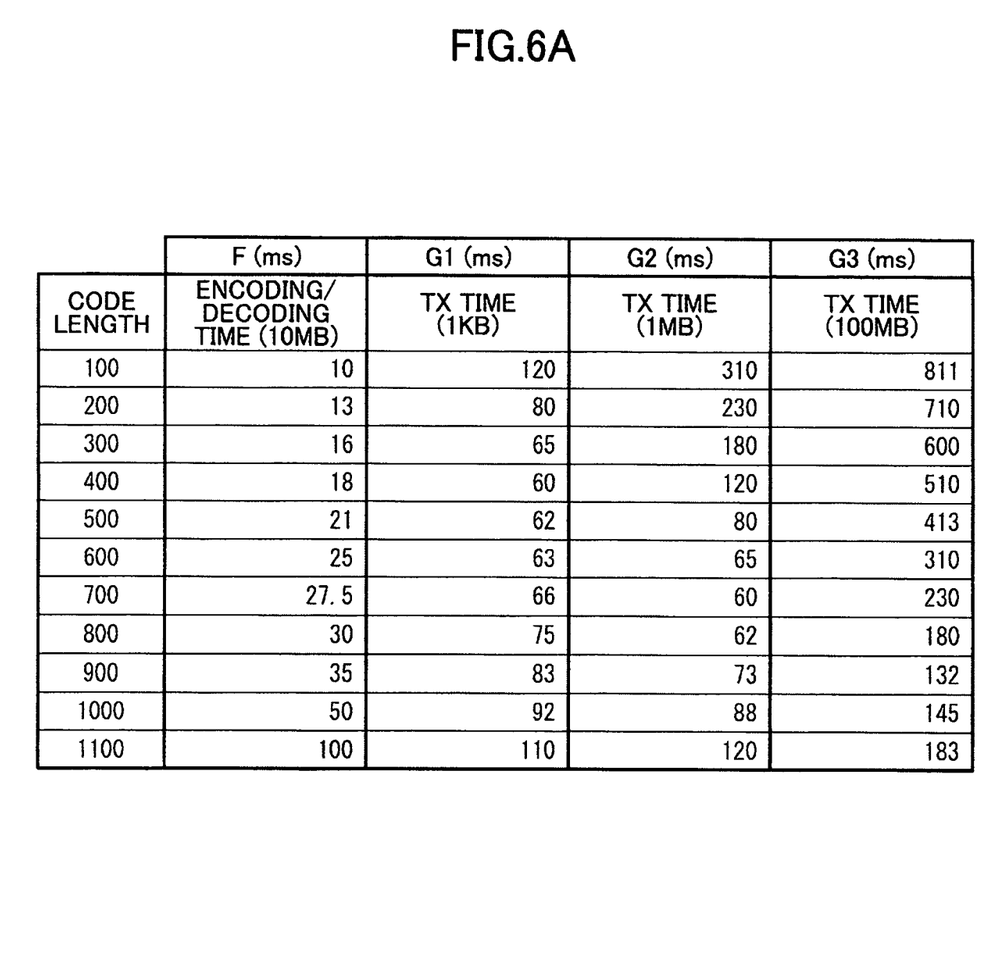
FIG. 6A is a table of an example of transfer time calculation data including encoding/decoding times and a transmission time ("TX time") with respect to various code lengths.
Figure 6B:
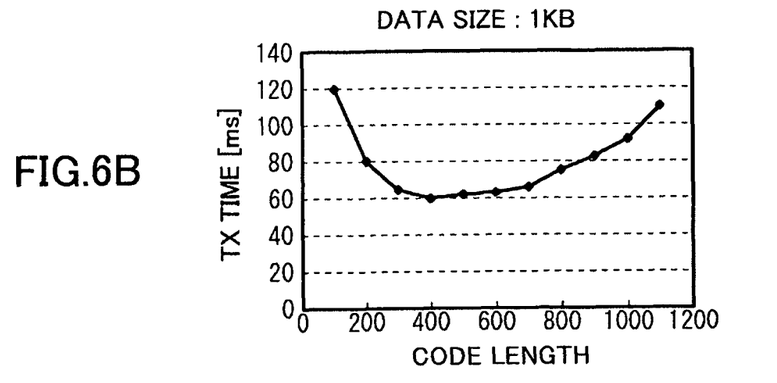
FIGS. 6B, 6C, and 6D are graphs plotting the transmission time versus the code length for various data sizes.
Figure 6C:
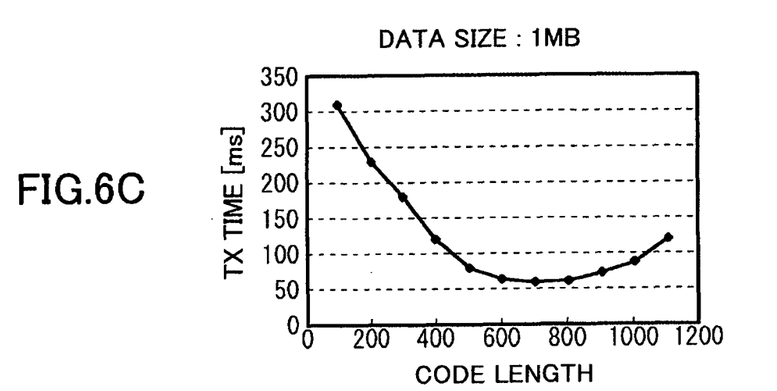
Figure 6D:
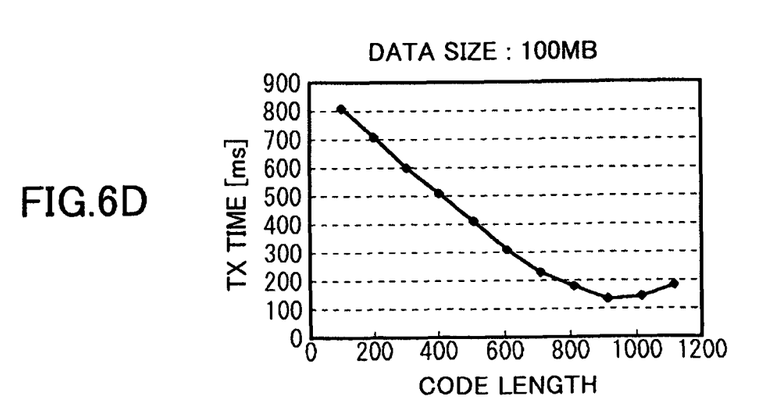

FIG. 6A illustrates an example of the transfer time calculation data, which may be stored in the HDD 105. The transfer time calculation data is used for calculating the transfer time of the transfer target data at various code lengths. FIGS. 6B through 6D are graphs plotting the data transmission time ("TX time") at the various data sizes illustrated in FIG. 6A, versus the code length.

The HDD 105 may store the transfer time calculation data in table form, as illustrated in FIG. 6A. The table of FIG. 6A stores the time ("encoding time") required for encoding the transfer target data and the time ("decoding time") required for decoding the transfer target data at various code lengths used for RPS-encoding information blocks. The table of FIG. 6A also stores the time ("TX time") required for transmitting the transfer target data encoded by the various code lengths. The relationship between the code length and the transmission time may be stored for different data sizes (such as 1 KB, 1 MB, and 100 MB as illustrated).

Generally, the encoding time and the decoding time vary in proportion to data size. On the other hand, as seen from the graphs of FIGS. 6B through 6D, the transmission time greatly varies depending on the data size of the transfer target data. The table illustrated in FIG. 6A may be obtained experimentally or via simulation. In accordance with the present embodiment, the relationship between the code length and the transmission time is stored for three data sizes, which may be referred to as "reference data sizes", for simplicity's sake. Preferably, the relationship between the code length and the transmission time may be stored for more data sizes (such as 100 KB and 10 MB in addition to the three). In this way, the transfer time may be more accurately calculated by the transfer time calculating unit 123.

The transfer time calculating unit 123 acquires the relationship between the code length and the transfer time for transmitting the transfer target data in encoded form, based on the data size received from the data size acquiring unit 122 and the table of FIG. 6A. The transfer time calculating unit 123 outputs the calculated transfer time for each of the code lengths to the code length determining unit 124.

The code length determining unit 124 receives the relationship between the code length and the transfer time for the data size of the transfer target data from the transfer time calculating unit 123. The code length determining unit 124 then determines an optimum code length for transferring the transfer target data based on the relationship between the code length and the transfer time for the data size of the transfer target data, and outputs the optimum code length to the encoding unit 125.

The encoding unit 125 acquires the transfer target data transmitted by the application 111 and also receives the optimum code length for the transfer of the transfer target data from the code length determining unit 124. The encoding unit 125 encodes the transfer target data with the RPS code having an optimum code length received from the code length determining unit 124. The encoding unit 125 then outputs the encoded data to the transfer unit 126.

Upon reception of the encoded data from the encoding unit 125, the transfer unit 126 transfers the data to the server 20 by the UDP. The data size acquiring unit 122, the transfer time calculating unit (relationship acquiring unit) 123, the code length determining unit 124, the encoding unit 125, and the transfer unit 126 may be realized by the CPU 103 executing the transfer software 113 stored in the ROM 10.

Figure 7:
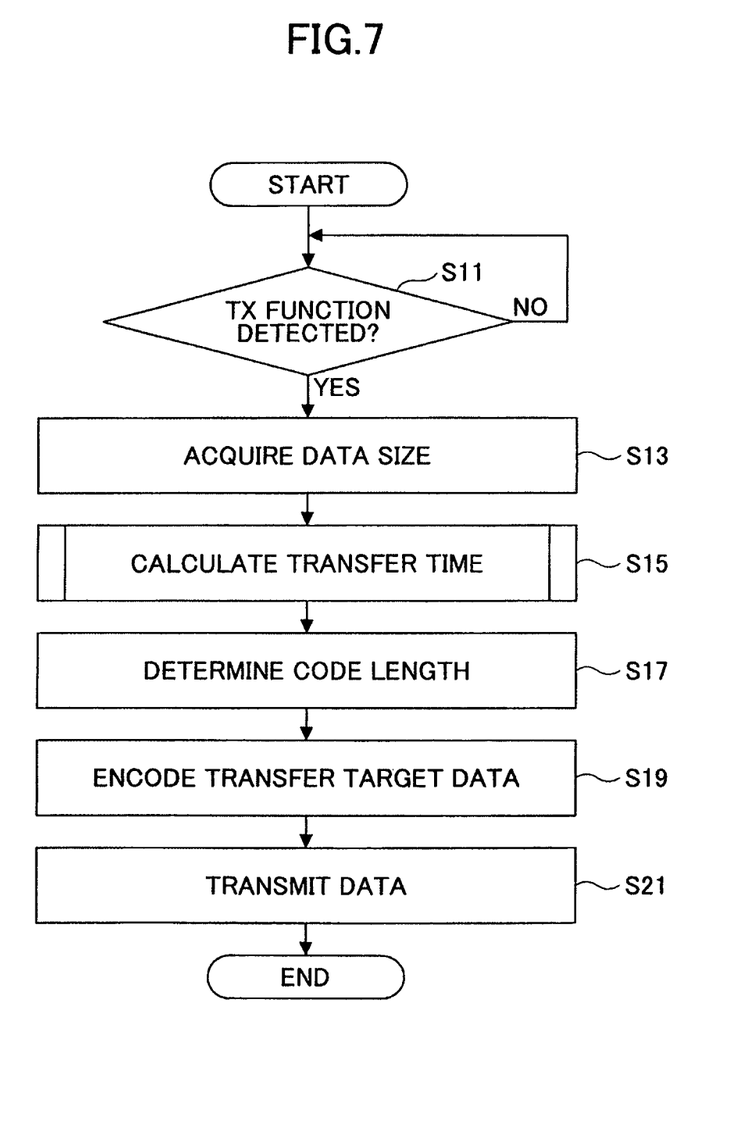
FIG. 7 is a flowchart of a process performed by the user terminal.

FIG. 7 is a flowchart of a data transfer process performed by the user terminal 10. First, the intercept unit 121 determines whether a transmission function of the application 111 is detected (step S11; monitoring step). If the result of step S11 is "NO", the intercept unit 121 repeats step S11. When the result of step S11 is "YES", the data size acquiring unit 122 acquires the data size of the transfer target data that has been stored in the shared memory 106 by the intercept unit 121 (step S13; data size acquiring step).

Next, the transfer time calculating unit 123 calculates the transfer time for each of different code lengths in the case of the data size of the transfer target data (step S15; relationship acquiring step). Specifically, in step S15, the relationship between the code length and the transfer time at the data size of the transfer target data is acquired. The transfer time calculating process is described with reference to a flowchart FIG. 8. The transfer time calculating unit 123 performs a test transfer with the server 20 as the data transfer destination, by using sample data that includes various combinations of data sizes and code lengths. During the test transfer, the transfer time calculating unit 123 acquires an encoding time, a decoding time, and a transmission time in an actual transfer environment (step S151).

Figure 8:
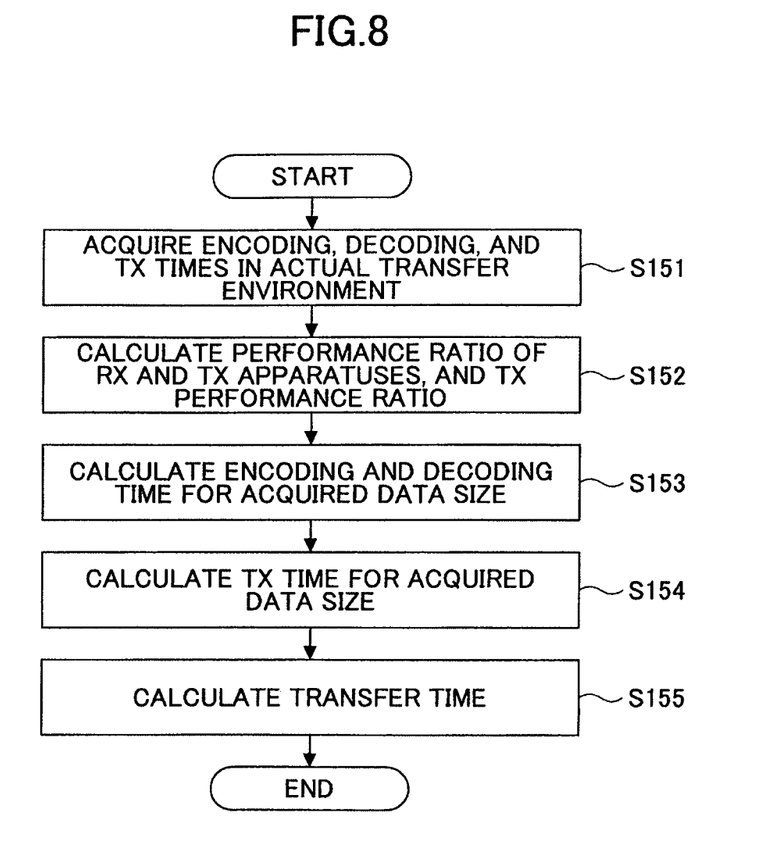
FIG. 8 is a flowchart of a transfer time calculating process.

The transfer time calculating unit 123, by using the acquired encoding time, decoding time, and transmission time, calculates a performance ratio ("PR") of the transmitting apparatus, a PR of the receiving apparatus, and a transmission PR (step S152). The transfer time calculating unit 123 may calculate the PR of the transmitting apparatus based on a relationship between the acquired encoding time in the actual transfer environment and the encoding time of FIG. 6A, according to the following equation:

PR of transmitting apparatus=(encoding time in actual transfer environment−encoding time of transfer time calculation data)/encoding time of transfer time calculation data For example, sample data obtained by encoding 10 MB of data with a code length 100 is test-transferred. According to FIG. 6A, the encoding time in the case where 10 MB of data is encoded with the code length 100 is 10 ms. In this case, when the encoding time (in the actual transfer environment) obtained as a result of the test transfer is 16 ms, the PR of the transmitting apparatus is calculated as follows:

(16 ms−10 ms)/10 ms=0.6

Similarly, the PR of the receiving apparatus may be determined from the relationship between the decoding time in the actual transfer environment and the decoding time according to FIG. 6A. Also, the transmission PR may be determined from the relationship between the transmission time in the actual transfer environment and the transmission time according to FIG. 6A.

The transfer time calculating unit 123 calculates the encoding time and the decoding time at the data size of the transfer target data for each code length (step S153). For example, the transfer time calculating unit 123 proportionally interpolates the encoding time according to FIG. 6A based on the data size of the transfer target data, while correcting the encoding time based on the PR of the transmitting apparatus, thereby obtaining the encoding time for each code length at the data size of the transfer target data. The transfer time calculating unit 123 may also proportionally interpolate the decoding time according to FIG. 6A based on the data size of the transfer target data while correcting the decoding time based on the PR of the receiving apparatus. In this way, the decoding time at the data size of the transfer target data may be obtained for each code length.

Referring to FIG. 6A, the transfer time calculating unit 123 may determine the encoding time in the actual transfer environment according to the following:

Encoding time in actual transfer environment=$F \times$ (data size of transfer target data/10 MB)/PR of transmitting apparatus where F is the encoding time or the decoding time at the code length.

Figure 9A:
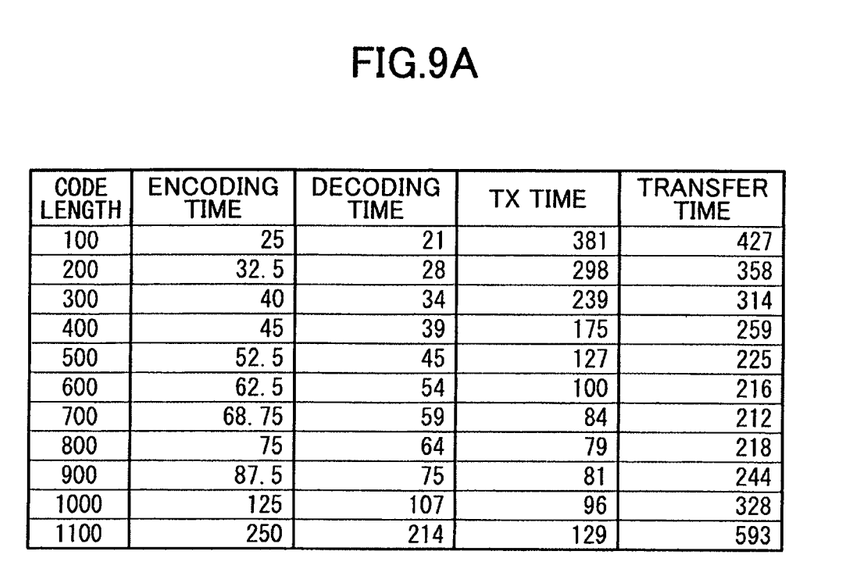
FIG. 9A is a table illustrating the transfer time with respect to various code lengths in an actual transfer environment with a data size of 15 MB.

The transfer time calculating unit 123 may determine the decoding time in the actual transfer environment according to the following:

Decoding time in actual transfer environment=$F \times$ (data size of transfer target data/10 MB)/PR of receiving apparatus The encoding time and the decoding time may be as illustrated in FIG. 9A when the data size of the transfer target data is 15 MB, the PR of the transmitting apparatus is 0.6, and the PR of the receiving apparatus is 0.7.

Next, the transfer time calculating unit 123 calculates the transmission time at the data size of the transfer target data for each code length (step S154). For example, the transfer time calculating unit 123 proportionally interpolates the data G1 through G3 illustrated in FIG. 6A based on the data size of the transfer target data while correcting the data based on the transmission PR, thus calculating the transmission time at the data size of the transfer target data for each code length.

For example, when the data size is 1 MB or more and 100 MB or less, the transfer time in the actual transfer environment may be determined by the following equation:

Transfer time in actual transfer environment={(G3−G2)/(100 MB−1 MB)×(data size of transfer target data−1 MB)+G2}/transmission PR Thus, when the data size of the transfer target data is 15 MB and the transmission PR is 1, the transmission time may be as illustrated in FIG. 9A.

Figure 9B:
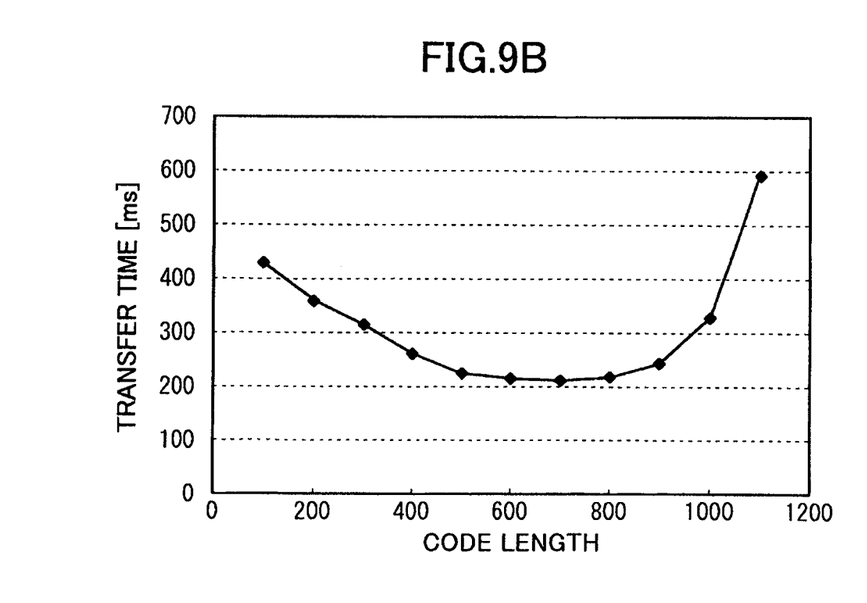
FIG. 9B is a graph plotting the transfer time versus the code length based on FIG. 9A.

The transfer time calculating unit 123 then calculates the transfer time by summing the encoding time, the decoding time, and the transmission time (step S155), thus completing the process. In this way, the relationship between the code length and the transfer time at the data size of the transfer target data is determined as illustrated in FIG. 9B.

Referring back to FIG. 7, the code length determining unit 124 determines an optimum code length for encoding the transfer target data based on the transfer time calculated by the transfer time calculating unit 123 (step S17; code length determining step). In accordance with the present embodiment, the code length determining unit 124 may determine the optimum code length that minimizes the transfer time as the code length for encoding the transfer target data. For example, according to FIG. 9B, the code length that minimizes the transfer time is "700". Thus, the code length determining unit 124 determines "700" as the optimum code length for encoding the transfer target data.

The encoding unit 125 encodes the transmission data with the optimum code length determined in step S17 (step S21;

encoding step). The transfer unit 126 then transmits the encoded data (step S23), thus completing the process.

When data transfer is performed by a combination of the RPS and the UDP, the transmission time may vary greatly depending on the code length used for RPS-encoding of data (FIGS. 6B through 6D). Thus, if RPS-encoding is performed with a fixed code length, data transfer may take longer than in the case of TCP transfer, depending on the data size of the transfer target data. In this case, the advantage of data transfer based on the combination of the UDP and the RPS (i.e., faster data transfer) may not be obtained.

In accordance with the present embodiment, the data size acquiring unit 122 acquires the data size of the transfer target data, and the transfer time calculating unit 123 acquires the relationship between the code length and the transfer time at the data size of the transfer target data, and the code length determining unit 124 determines an optimum code length for encoding the transfer target data based on the relationship between the code length and the transfer time at the data size of the transfer target data. Then, the encoding unit 125 encodes the data with the optimum code length.

In this way, the code length can be determined while taking into consideration the influence of the data size of the transfer target data on the transfer time, thereby enabling a decrease in transfer time. While various amounts of data may be transferred in cloud computing, the code length can be dynamically varied depending on the data size of transfer target data in accordance with the present embodiment, so that the data transfer rate can be increased. Namely, the data transfer time can be optimized by varying (i.e., optimizing) the code length used for RPS-encoding dynamically depending on the data size of transfer target data, rather than using a fixed code length. Therefore, the advantage of data transfer based on the combination of the UDP and the RPS, namely high-speed data transfer, can be provided.

Preferably, the transfer time calculating unit 123 may acquire the relationship between the code length and the transfer time for the acquired data size by interpolating a reference relationship between the code length and the transfer time, where the reference relationship may be prepared in advance experimentally or by simulation for various data sizes. Thus, an accurate relationship between the code length and the transfer time can be determined, thus enabling the determination of an appropriate code length and enabling an increase in the data transfer rate.

Preferably, the transfer time calculating unit 123 may correct the reference relationship between the code length and the transfer time based on a transfer time ("tested transfer time") acquired by utilizing test data in an actual data transfer environment. Then, the transfer time calculating unit 123 may acquire the relationship between the code length and the transfer time for the data size of transfer target data, based on the corrected relationship between the code length and the transfer time. Thus, the transfer time can be calculated by taking into consideration the status of the actual transfer environment. Thus, a more appropriate code length can be obtained than is possible by calculating the transfer time by only using the reference transfer time calculation data. Thus, the data transfer rate can be increased.

The intercept unit 121 determines whether the transfer target data is transmitted from the application 111 to a destination outside the application 111 (such as the application 212). When the transfer target data is transmitted, the intercept unit 121 acquires the data size of transfer target data from the transmission function of the application 111. Thus, there is no need to write, in the program code of the application 111, a code for starting up the transfer software 113 or a code for delivering the data size of the transfer target data to the transfer software 113. Thus, the transfer rate of the data transmitted from various applications executed in the user terminal 10 or the server 20 can be increased without modifying the application 111.

Preferably, the user terminal 10 may not include the intercept unit 121. Namely, the injection DLL 112 may not be installed. In this case, the same effect as that of the foregoing embodiment may be obtained by modifying the application 111 such that the data size of the transfer target data can be delivered to the data size acquiring unit 122 by starting up the transfer software 113.

While the foregoing embodiment is directed to an example of data transfer between the user terminal 10 and the server 20, an embodiment of the present invention may be applied to data transfer between servers. The functionality of the user terminal 10 may be realized by a computer including a CPU, a ROM, and a RAM by executing a program encoding the processes of the functions of the user terminal 10. The program may be recorded in the computer-readable recording medium 108.

The program may be distributed by selling the computer-readable recording medium 108 in the form of a DVD (Digital Versatile Disc), a CD-ROM (Compact Disc Read Only Memory), or other portable recording media. The program may also be stored in a memory unit of a server computer, from which the program may be transferred to another computer via a network.

The computer may store the program recorded in the portable recording medium 108 or transferred from the server computer in a memory unit of the computer. The computer may then read the program from the memory unit and execute a process in accordance with the program. Alternatively, the computer may read the program directly from the portable recording medium 108 via the media drive unit 107 and then execute a process in accordance with the program. Further alternatively, the computer may execute a process in accordance with a program each time the program is transferred from the server computer.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory recording medium storing a data transfer program configured to cause a computer to perform a procedure of transferring data encoded with a loss correction code by using a protocol having no error correction function, the procedure comprising:

acquiring a data size of transfer target data;

acquiring a relationship between a code length of the loss correction code for encoding the transfer target data and a transfer time for the acquired data size of the transfer target data;

determining an optimum code length of the loss correction code for encoding the transfer target data based on the acquired relationship between the code length and the transfer time for the acquired data size; and encoding the target data with the loss correction code having the optimum code length.

2. The computer-readable, non-transitory recording medium according to claim 1, wherein the acquiring the relationship between the code length and the transfer time for the acquired data size includes
preparing a reference relationship between the code length and the transfer time in advance for each of a plurality of reference data sizes by experiment or simulation, and
interpolating the reference relationship between the code length and the transfer time.

3. The computer-readable, non-transitory recording medium according to claim 2, wherein the relationship between the code length and the transfer time for the acquired data size includes
acquiring a tested transfer time by using test data in an actual data transfer environment;
correcting the reference relationship between the code length and the transfer time for each of the reference data sizes based on the tested transfer time, and
acquiring the relationship between the code length and the transfer time for the acquired data size of the transfer target data based on the corrected reference relationship between the code length and the transfer time.

4. The computer-readable, non-transitory recording medium according to claim 1, the procedure further comprising:
determining whether the transfer target data is transmitted from an application to a destination outside the application,
wherein the data size of the transfer target data is acquired upon transmission of the transfer target data from the application to the destination outside the application.

5. A data transfer method for transferring data encoded with a loss correction code by using a protocol having no error correction function, the method comprising:
acquiring a data size of transfer target data;
acquiring a relationship between a code length of the loss correction code for encoding the transfer target data and a transfer time for the acquired data size;
determining an optimum code length of the loss correction code for encoding the transfer target data based on the acquired relationship between the code length and the transfer time for the acquired data size; and
encoding the data with the loss correction code having the optimum code length.

6. An information processing apparatus comprising:
a data size acquiring unit configured to acquire a data size of transfer target data;
a relationship acquiring unit configured to acquire a relationship between a code length of a loss correction code for encoding the transfer target data and a transfer time for the acquired data size;
a code length determining unit configured to determine an optimum code length of the loss correction code for encoding the transfer target data based on the relationship between the code length and the transfer time acquired by the relationship acquiring unit for the acquired data size;
an encoding unit configured to encode the transfer target data with a loss correction code having the optimum code length; and
a transfer unit configured to transfer the transfer target data encoded with the loss correction code having the optimum code length by using a protocol having no error correction function.

7. An information processing apparatus comprising:
a processor configured to execute a procedure, the procedure comprising:
acquiring a data size of transfer target data;
acquiring a relationship between a code length of the loss correction code for encoding the transfer target data and a transfer time for the acquired data size;
determining an optimum code length of the loss correction code for encoding the transfer target data based on the acquired relationship between the code length and the transfer time for the acquired data size; and
encoding the data with the loss correction code having the optimum code length.

* * * * *